(12) United States Patent
Bolzonaro et al.

(10) Patent No.: US 6,347,887 B1
(45) Date of Patent: Feb. 19, 2002

(54) LINEAR GUIDE TO SUPPORT A SLIDING ELEMENT

(75) Inventors: Loris Bolzonaro; Massino Ramponi, both of Sesto San Giovanni (IT)

(73) Assignee: Rollon S.p.A., Sesto San Giovanni (IT)

( * ) Notice: Subject to any disclaimer, the term of this patent is extended or adjusted under 35 U.S.C. 154(b) by 0 days.

(21) Appl. No.: 09/521,841

(22) Filed: Mar. 9, 2000

(30) Foreign Application Priority Data

Apr. 9, 1999 (IT) ........................................ MO99A0725

(51) Int. Cl.[7] .............................................. F16C 29/04
(52) U.S. Cl. ......................................................... 384/58
(58) Field of Search .............................. 384/58, 53, 55, 384/50, 59

(56) References Cited

PUBLICATIONS

"Guide a Rotelle" Firm INA (no date).
"Monorail" Firm Winkel (no date).
"Catalogue 41–30E" Firm Rollon (no date).

*Primary Examiner*—Lenard A. Footland
(74) *Attorney, Agent, or Firm*—Keil & Weinakuf

(57) ABSTRACT

A longitudinal cavity is defined in the fixed longitudinal support (2) preferably presenting a square section (7) within which a main sliding cursor (6) is held to which at least one auxiliary cursor (10) is associated, the two cursors together are suited to bearing rollers (8) that can slide along four races (9) coinciding with the sides of said longitudinal cavity set with a diagonal coinciding with the action line (II—II) of the load (P) supported by the linear guide (FIG. 3).

8 Claims, 4 Drawing Sheets

LINEAR GUIDE TO SUPPORT A SLIDING ELEMENT

FIELD OF THE INVENTION

The present invention concerns a linear guide to support a sliding element, as, for example, a door or part of a machine.

THE PRIOR ART

The linear guides comprise a fixed longitudinal support and a mobile part on rollers that slides along the longitudinal support holding a sliding unit suspended or bearing from above.

In known guides the fixed longitudinal support is generally shaped so as to present one or two plane sliding races upon which at least two rollers for each race roll charging radially Generally the roller cursor runs astride the guide and the cross-sectional encumbrance is given by the sum of the dimensions of the guide plus the dimensions of the rollers; this solution is shown in FIG. 1. Opposite versions are also known in which the guide has the inner sliding races and in these versions the guide is large enough to contain also the roller cursor and the cross-sectional encumbrance is similar to the version previously described.

SUMMARY OF THE INVENTION

The main purpose of the present invention is to offer a linear guide that features a smaller transversal section compared to known guides, at equal roller dimensions and load capacity.

This linear guide belongs to the type of guides with the sliding cursor within the fixed longitudinal support and is characterised by a cursor that comprises a main cursor bearing a main group of rollers and at least one auxiliary cursor which bears an auxiliary group of rollers, the auxiliary cursor being adjustable in respect of the main cursor in order to move with respect to the other group. The two cursors carry rollers that can roll along four races defined within a longitudinal cavity that has a parallelogram cross-section and is formed within the fixed longitudinal support in order that one of its diagonals coincides with the line of action of the load supported by the guide and to have a longitudinal aperture along one of the vertexes crossed by said line in order to allow the passage of the parts that connect the cursor to the sliding element, so that the latter and the cursor may slide along said support. One group of rollers can roll along the two races that will take the load and the other group can roll along the other two races, but the adjustment means allow to transfer the engagement of each group of rollers from the two races to the opposite two, so that the guide can work with the sliding element above or below the guide, the load being borne by the four rollers of the main group in any case. This characteristic of being able to use the guide with the sliding element above or else below the guide is conventionally called "guide inversion". The longitudinal cavity will preferably have a square section and the description herein will relate to such square section embodiment.

The auxiliary cursor, preferably set at the centre of the main cursor, is fixed to the latter by means of a coupling in sliding-guiding engagement, sliding and fastening screws and spacing screws, all together suited to adjust the relative movement of the two cursors, as it will be explained in detail with the example of embodiment.

In one embodiment of the present invention, in which the load transmitted by the sliding element is applied above the guide, the main group of rollers bears at least one pair of rollers that are longitudinally spaced from one another and charge on a first common lower race and bears at least a second pair of longitudinally spaced rollers charging on a second common lower race positioned at 90° with respect to the first race; the auxiliary cursor is positioned between the said first and second pairs of rollers, preferably at the centre of the main cursor, and bears at least two rollers at 90° from one another that respectively charge upon the two upper races.

According to said embodiment we have a guide bearing at least six rollers, four of which charge upon the lower races supporting the load transmitted by the sliding element and two are just slightly engaged on the two lower races so that the cursor is held in all transversal directions during its sliding along the guide.

The advantages of this guide lie in that, given the same load capacity, compared to a known guide, it allows for a greater compactness and lightness, a protected positioning of the roller system and the fact that all the rollers conveniently charge on the respective races in order to provide a sliding free of undesirable transversal jolting and the possibility of guide inversion.

BRIEF DESCRIPTION OF THE DRAWINGS

The invention will be described in further detail by means of an example of embodiment and the support of the attached drawings in which.

DESCRIPTION OF THE PREFERRED EMBODIMENTS

Figure 1:
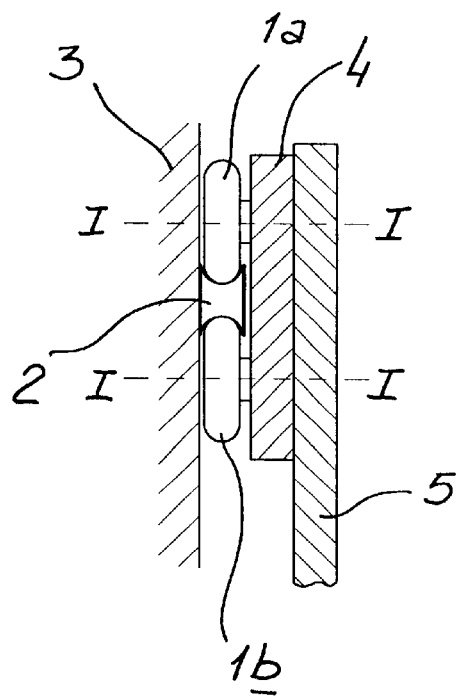
FIG. 1 is a part section that serves as reference to the state of the art.

FIG. 1 is a transversal section of a guide that responds to the state of the art and bears a pair of upper rollers 1a and a pair of lower rollers 1b astride the longitudinal support 2 fixed to a vertical wall 3; the rollers are hinged according to the I—I axes onto cursor 4 that supports the sliding door 5.

Figure 2:
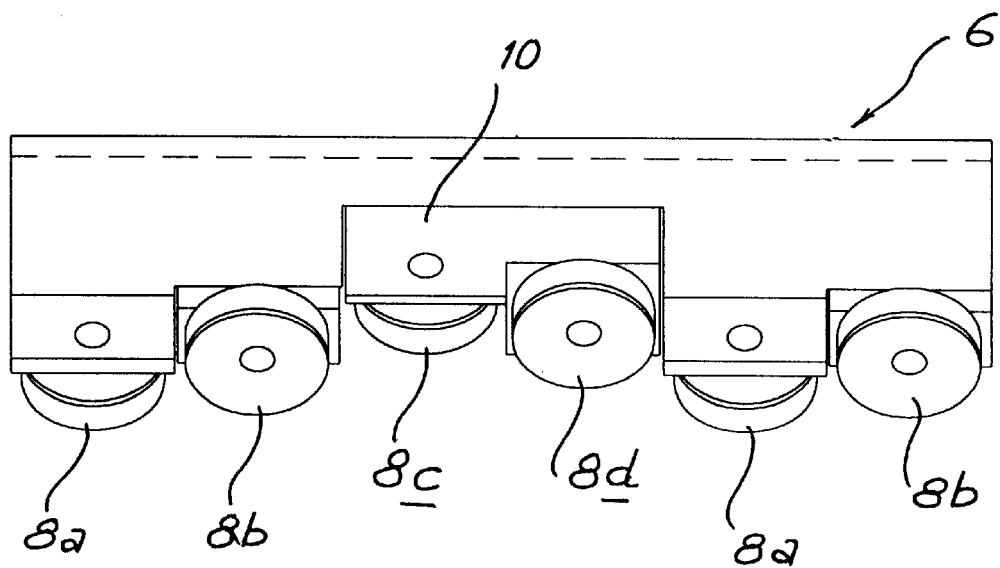
FIG. 2 is a first longitudinal view.
Figure 3:
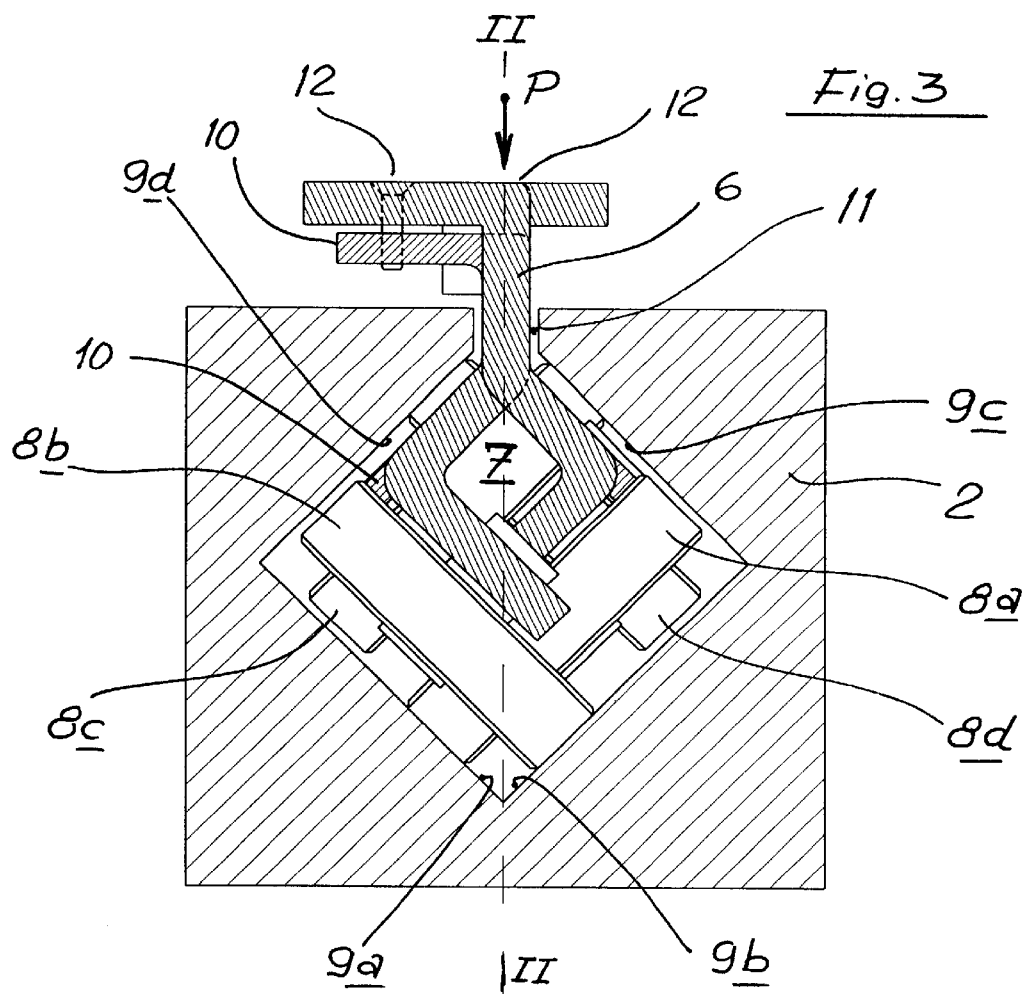
FIG. 3 is a first transversal section.

FIGS. 2 and 3, and the others, show a guide bearing six rollers, as featured by a preferred embodiment of the guide invented. It is useful to consider FIGS. 2 and 3 together. A vertical load P acting according to the transversal symmetry axis II—II of the square longitudinal cavity 7, weighs upon the fixed longitudinal support 2 through the main cursor 6 that is held in a sliding manner within cavity 7 as it carries the main group of rollers made up of two pairs 8a and 8b one on one side and the other on the other side of the centre of the main cursor 6. The 8a pair of rollers charges and can roll along the lower race 9a of the longitudinal support 2 and the 8b pair of rollers charges and can slide along the lower race 9b of the longitudinal support 2, the two races obviously being at 90° from one another. The auxiliary cursor 10, engaged in an adjustable manner in a suitable seat at the centre of the main cursor 6 with adjustment means of which only the spacing screws 12 are shown herein, bears the auxiliary group of rollers made up by a roller 8c just slightly engaged upon the upper race 9c and a roller 8d just slightly engaged upon the upper race 9d this just slight engagement being a desired light pressure upon the races, obtained by means of the said adjustment of the auxiliary cursor compared to the main one. An extension of the main cursor 6 passes through aperture 11 of the longitudinal support 2 in order to be fitted to the sliding element (not shown) and an extension of the auxiliary cursor 10 passes through aperture 11 to be fastened to the main cursor.

Figure 4:
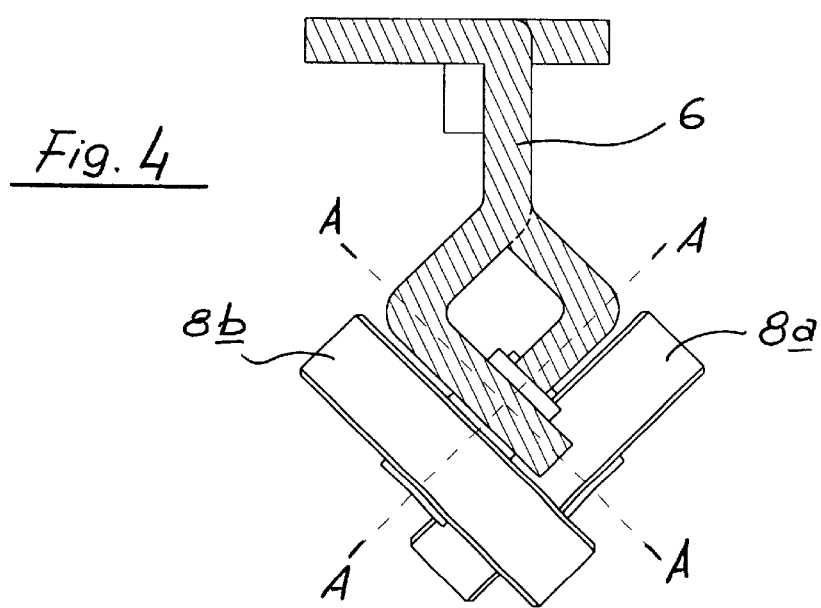
FIG. 4 is a first part section transversal section.

FIG. 4 shows the main cursor 6 and relative rollers 8a, 8b, that can rotate round axes A—A.

Figure 5:
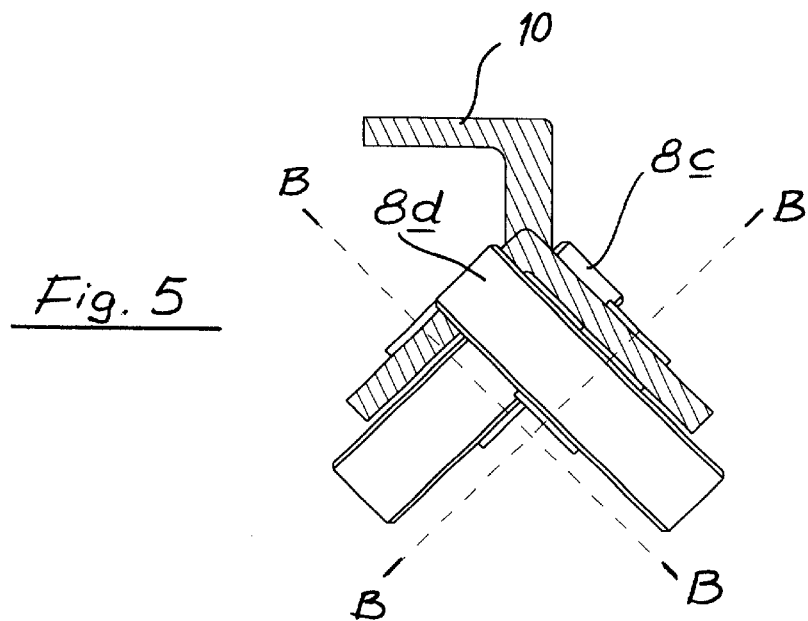
FIG. 5 is a second part section transversal section.

FIG. 5 shows the auxiliary cursor 10 and related rollers 8c, 8d that can rotate around axes B—B.

Figure 6:
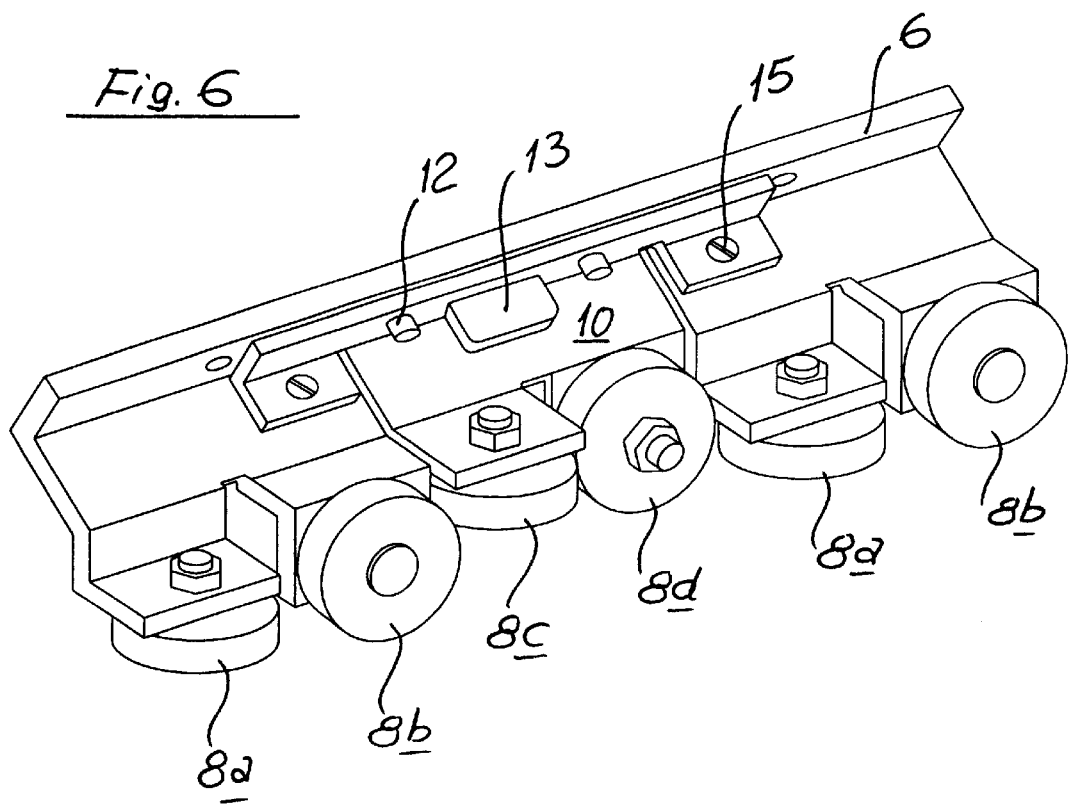
FIG. 6 is first perspective view.
Figure 7:
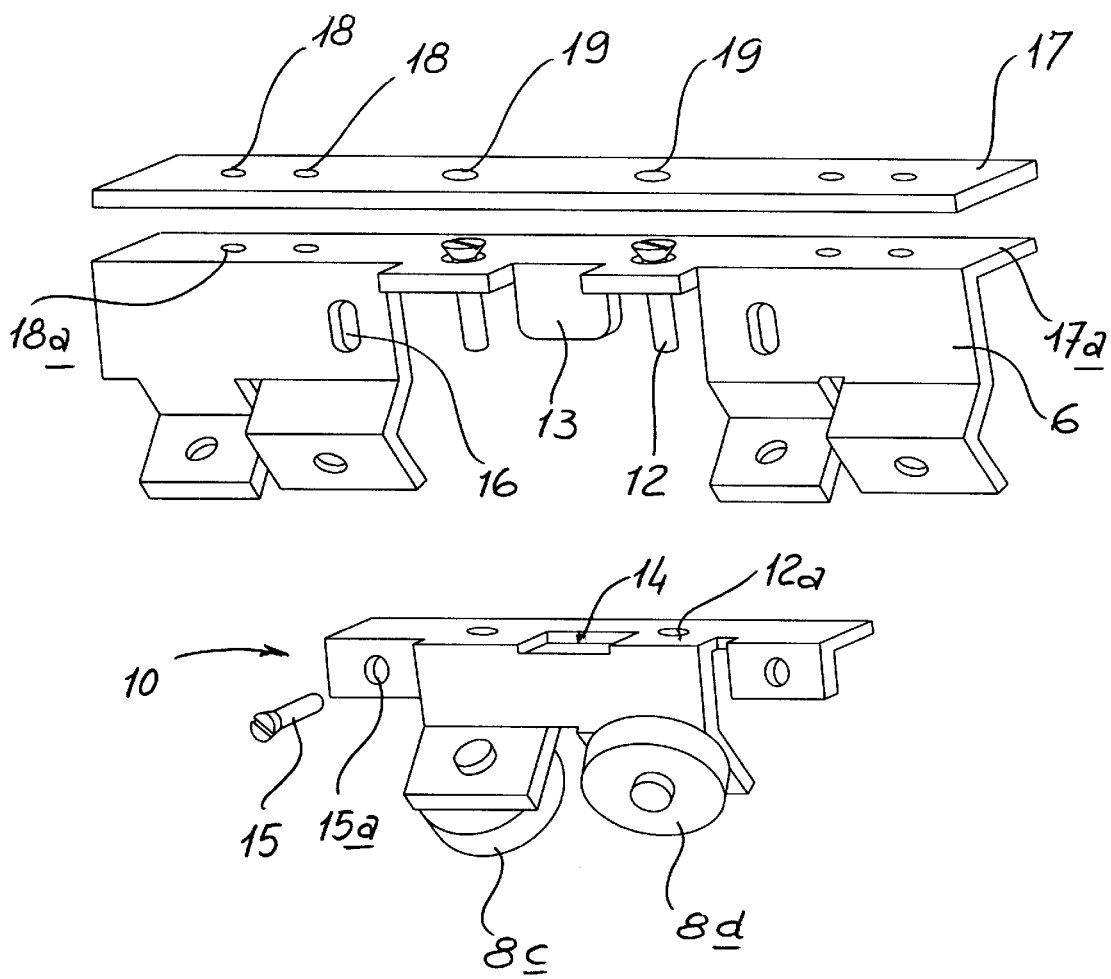
FIG. 7 is a second partly blown-up perspective view.

FIGS. 6 and 7 show in detail a solution for fixing the auxiliary cursor 10 to the main cursor 6 in an adjustable manner in order that the two groups of rollers move within a given field, so as to transfer the engagement of each group of rollers from two races to the other two opposite races and realise the guide inversion. The tongue 13 is held in the calibrated aperture 14 (sliding-guiding engagement); the sliding and locking screws 15 are made to pass through the holes 15a and slits 16 behind which screws 15 are fitted with a washer and a lock-nut that are not shown; a covering plate 17 is fixed to the flat part 17a of the main cursor 6 with screws that are not shown engaged in holes 18, 18a in correspondence with the spacing screws 12 that pass through the flat part 17a to be engaged in the threaded holes 12a of the auxiliary cursor; on plate 17 holes 19 are foreseen, tighter than the heads of screws 12, through which screws 12 can be fully fastened or unfastened in order to end up forcing against the plate 17 with their heads so that the auxiliary group of rollers are forced against races 9a, 9b and the main group of rollers are forced against races 9c, 9d. It is understood that the "screwing field" assigned to the screws 12 allows to adjust the distance between the two cursors as required in the direction of the transversal symmetry, axis 11—11 and, hence, the position of the rollers with respect to the races and, which is very important, to cause the guide inversion. After having chosen the relative position of the two cursors 6 and 10, the screws 15 are locked into the desired position.

It is also understood that this linear guide can bear more than two pairs of rollers 8a, and 8b on the main cursor 6 and can comprise more than one auxiliary cursor 10, each bearing one or more pairs of rollers 8c, 8d, depending on the working conditions of the guide; with only one auxiliary cursor it could be at the centre of the main cursor and if there are two auxiliary cursors they can, each of them, be at opposite ends of the main cursor.

What is claimed is:

1. A linear guide to support a sliding element (5) in which a cursor fitted with rollers and bearing the sliding element can move along a fixed longitudinal support (2) wherein within the fixed longitudinal support (2) a longitudinal cavity is defined having a parallelogram section (7) within which a cursor is received to slide, the cursor comprises a main cursor (6) to which at least one auxiliary cursor (10) is associated, the two cursors together being suited to bearing rollers (8) that can roll along four races (9) coinciding with the sides if said longitudinal cavity set with one diagonal coinciding with the line of action (II—II) of load (P) supported by the linear guide, the longitudinal cavity features a longitudinal aperture (11) at the vertex adjacent to the sliding element for the passage of the fastening means of the main cursor (6) with the sliding element (5) and of an extension of the auxiliary cursor (10) with which to connect to the main cursor.

2. A linear guide according to claim 1 wherein the main cursor (6) bears at least one main group of rollers made up of a first pair of rollers (8a) longitudinally spaced from one another and charging upon a first race (9a) and at least one second pair of rollers (8b) longitudinally spaced from one another and charging upon a second race (9b) symmetrically adjacent to the first compared to said line of action (II—II) and that the auxiliary cursor (10) bears at least an auxiliary group of rollers made up of at least one roller (8c) engaged upon a third race (9c) and at least one roller (8d) engaged on a fourth race (9d).

3. Linear guide according to claim 1 wherein the auxiliary cursor (10) is set at the centre of the main cursor (6) between the pairs of the first and second group of rollers.

4. Linear guide according to claim 1 wherein a first and a second auxiliary cursors (10) are set each at one end of the main cursor (6).

5. Linear guide according to claim 1 wherein a main group of rollers (8a, 8b) transmits the load (P) to the races supported by the linear guide and an auxiliary group of rollers (8c, 8d) is just slightly engaged on the respective guides in order to avoid transversal movements or vibrations during the sliding of the cursor.

6. Linear guide according to claim 1 wherein means are comprised that adjust the position of the auxiliary cursor (10) with respect to the main cursor (6) providing for the sliding of the auxiliary cursor in the direction of the action line (II—II) and further locking into the desired position, so that each group of rollers (8) comes to be engaged as desirable onto their respective races (9).

7. Linear guide according to claim 1 wherein the means that adjust the position of the auxiliary cursor comprise a unit formed by a sliding-guiding engagement (13, 14) between the main cursor and the auxiliary cursor, sliding and fastening screws (15) that, once loosened, allow the sliding of the auxiliary cursor on the main cursor while spacing screws (12) bring the auxiliary cursor into the desired position in respect of the main cursor, position in which the auxiliary cursor is locked by means of the sliding and fastening screws (15).

8. Linear guide according to claim 1 wherein a covering plate (17) fixed to the main cursor (6, 17a) covers the heads of the spacing screws (12) thus defining a screwing interval between the covering plate and the lower screw position.

* * * * *